Patented Sept. 29, 1942

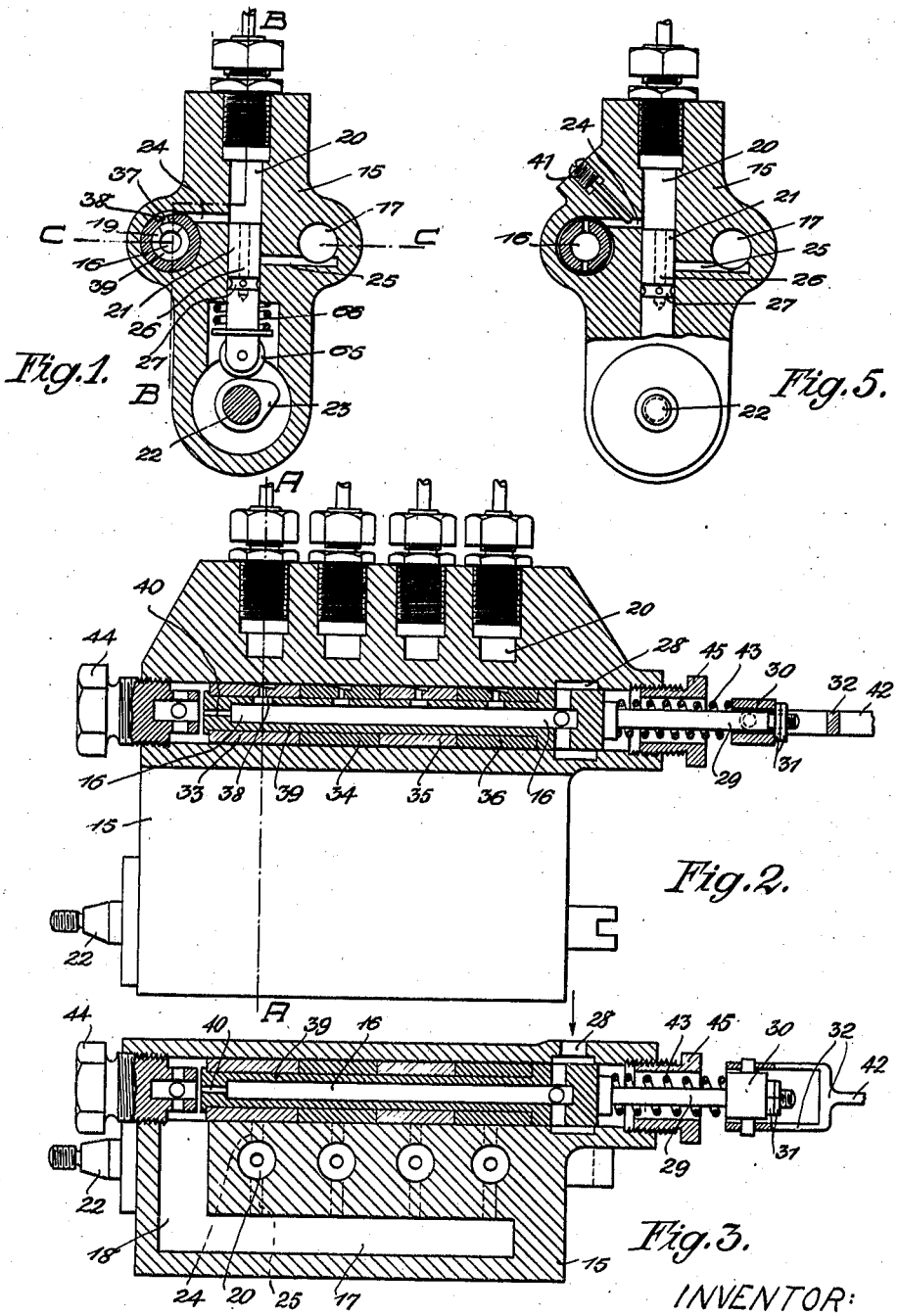

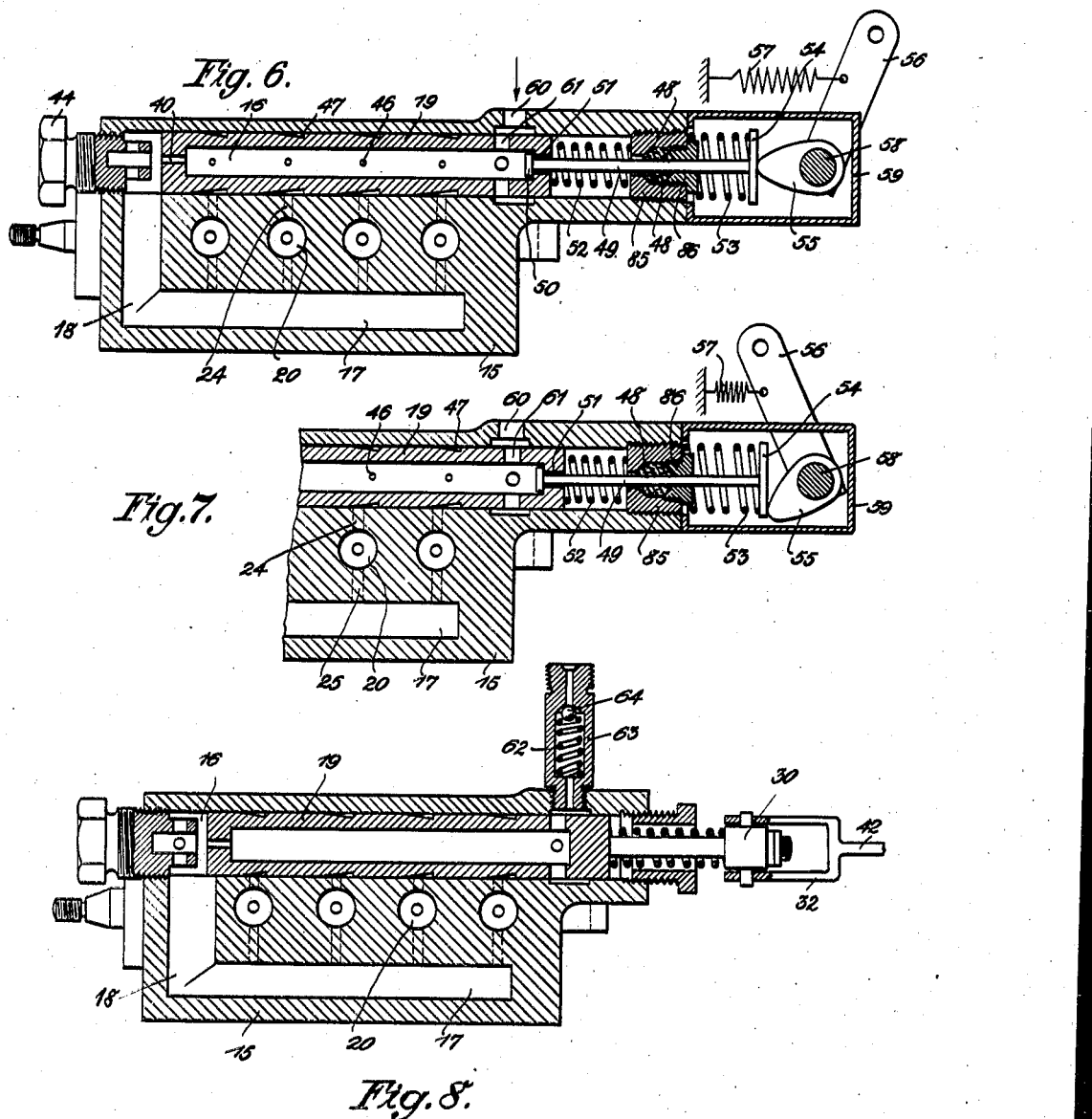

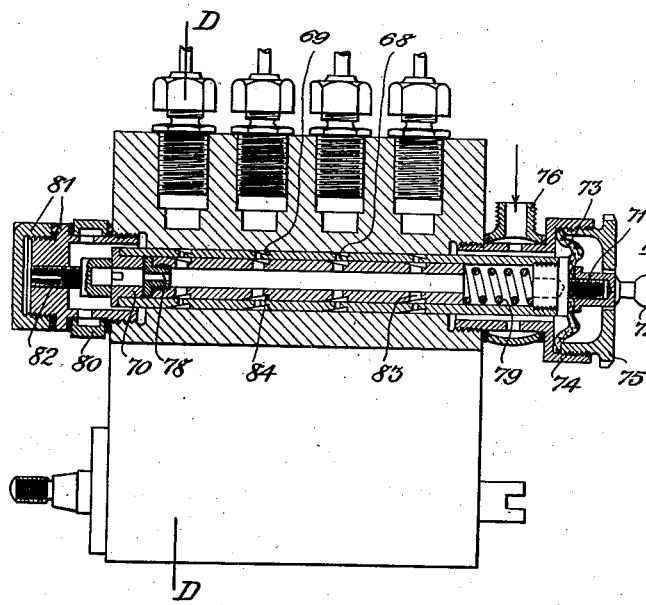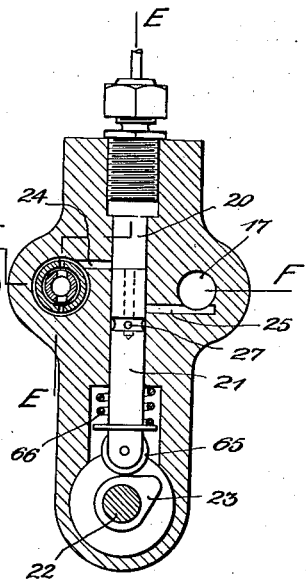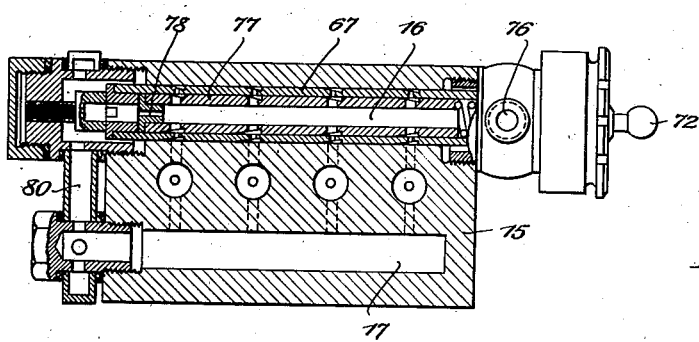

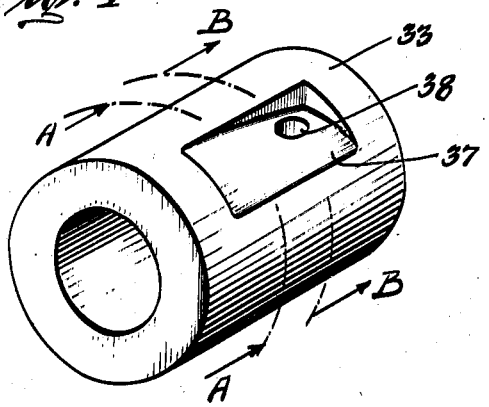
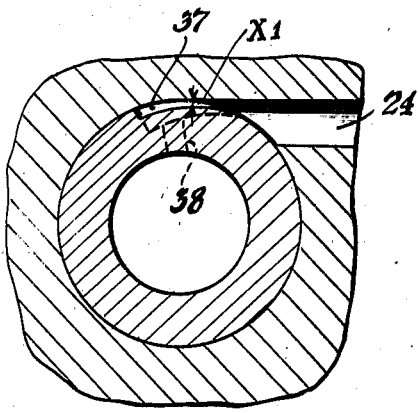
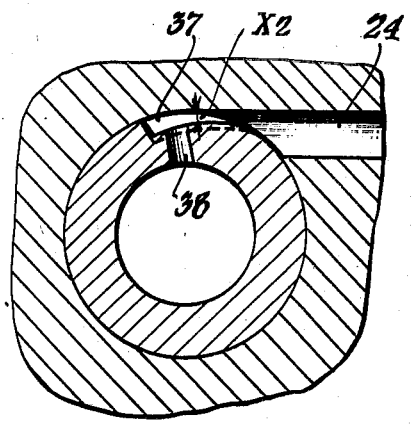

2,297,234

UNITED STATES PATENT OFFICE 2,297,234

FUEL PUMP REGULATION

Samuel Meiswinkel, Gaggenau, Germany; vested in the Alien Property Custodian

Application January 17, 1939, Serial No. 251,327
In Germany January 26, 1938

9 Claims. (Cl. 103—41)

The invention relates to the regulation of the fuel pumps of internal combustion engines, and has for its object the prevention of excessive speeds of engine revolution, whilst still permitting regulation for the purpose of varying the feed for various loads upon the engine. The broader aspects of this invention are covered by my co-pending application Serial No. 251,326, filed of even date herewith.

In accordance with the invention, this regulation is made possible by a member common to both operations, the member being adjusted automatically for limiting the maximum engine speeds, and at will for the regulation of the fuel supply according to the load on the engine. The common member is subject to the influence of a constant and a variable function for the regulation of the fuel supply for the purpose of limiting the maximum engine speeds, and is adjusted by a manual control, such as the accelerator pedal for the regulation of the fuel in accordance with the load on the engine.

The adjustment of the regulating member at will is effected through the medium of spring means in such fashion that the automatic adjustment for the limitation of the maximum engine speeds can take place independently of the regulation of the fuel supply at will in accordance with the load on the engine.

The invention effects a substantial simplification in comparison with known pump regulators, wherein separate members are provided, one for each of the functions above referred to.

In view of the unavoidable inaccuracies of manufacture, a separate throttling means may be provided for each cylinder of the fuel pump and may consist either of an adjustable screw extending into the inflow passage or of individual valve parts having shaped recesses, which parts are disposed upon a connecting tube so as to be capable of being turned relatively to each other so as to vary their respective port openings.

For the actuation of the common regulating member, which may be a tubular slide-valve, it has proved appropriate to admit the fuel at the mechanically operated end of the valve. The valve is readily movable axially in its bore, by means of a linkage which operates the valve non-positively by spring means. The actuation of the linkage may be effected either directly from the accelerator pedal or by means of a lever and cam. The spring arrangement may be such that in the idle-running position, a stronger spring always forces the valve into a position in which only narrow inflow passages to the pump pistons are open.

A further object is to provide for the de-aeration of the suction and pressure spaces of the fuel pump. Such de-aeration may be effected in a particularly advantageous manner by operating the controlling valve as a pump. In such operation the valve draws fuel from the supply passage, when the engine is at rest and supplies it to all the spaces in the pump and also to the pressure passages leading to the cylinders of the internal combustion engines, so that the air present in the pump and in the passages is got rid of. The valve, for this purpose, may be operated by the accelerator lever, for example from the driver's position, by simple up and down movement of this lever, and the fuel pump may thus be de-aerated with the engine at rest. In the supply passage from the fuel reservoir to the pump, there may be a non-return valve to prevent back-flow of the fuel.

With the engine at rest and the screw connections for the nozzles on the cylinder heads undone, the valve is moved impulsively to and fro by means of the accelerator lever. Upon pulling this lever, fuel flows in from the supply passage through the recesses of the valve, whereas, upon pressing down the lever, the fuel situated in the suction passage and return-flow passage is subjected to pressure. Thus, fuel passes through the controlling valve and is forced by way of the suction passages (or through a relief bore, if a pump piston is standing precisely at the upper dead-centre position) into the pressure spaces of all the pump pistons and thence by way of the pressure valves into the pressure passages. In this fashion, the air present in the pressure spaces and passages is carried along and the pump is effectually de-aerated without the employment of separate devices for the purpose. The pumping movement of the valve is continued until fuel emerges from all passages whose nozzle connections have been previously undone, or from the nozzle.

A further object is to divide the common control valve so that it comprises two valves, sliding one in the other, with inter-related actions. It has proved that a regulating member adjustable within wide limits is advantageous for the regulation at will of the fuel supply, whereas a member adjustable within narrower limits is desirable for the automatic regulation for the purpose of preventing excessive speed. The two valves sliding one in the other fulfil these requirements, the outer valve, for example, possessing comparatively wide or long control portings and being actuated by the accelerator lever. The second sliding within the first has comparatively short control portings. During normal operation, the second valve is pressed by a spring against a stop in the first valve, so that the full passage cross section from the supply to the control portings of the outer valve is available for the fuel. The inner valve for the automatic regulation of the maximum engine speed is provided with a throttling member which connects the pump inflow passage to the pump relief passage. If the dynamic pressure in front of the throttling member exceeds the spring pressure with which the inner valve is pressed against the said stop then a constriction takes place of the passages to the outer valve and, consequently, to the spaces of the pump pistons. Thus, less fuel is supplied to the cylinders of the internal combustion engine and running away of the said engine is prevented.

By the division of the regulating member into two valves sliding one in the other and dependent one on the other, the requirements of operation in regard to wide regulation of the fuel supply at will and quickly acting regulation for the automatic limitation of the maximum speed can be taken into account.

Embodiments of the invention by way of example are illustrated diagrammatically in the annexed drawings, wherein:

Figure 1 is a cross section through a fuel pump having an improved regulator, the section being taken on the line A—A of Figure 2;

Figure 2 is a longitudinal section taken on the line B—B of Figure 1;

Figure 3 is a horizontal section taken on the line C—C of Figure 1;

Figure 4 is an enlarged perspective view of an individual part of the controlling valve seen in Figures 1 to 3;

Figure 4a is a transverse cross-sectional view along the line A of Fig. 4, showing the relationship of the valve part to the surounding pump casing;

Figure 4b is a similar transverse cross-sectional view along the line B of Fig. 4;

Figure 5 is a cross section of a modification;

Figure 6 is a plan section similar to Figure 3, but illustrating a further modification;

Figure 7 is similar to Figure 6 but shows the parts in a different position;

Figure 8 is a plan section illustrating yet another modification;

Figure 9 is a longitudinal section of a fuel pump having a divided form of regulator the section being taken on the line E—E (Figure 10);

Figure 10 is a cross section taken on the line D—D (Figure 9); and

Figure 11 is a plan section taken on the line F—F of Figure 10.

In Figures 1 to 3 the fuel pump 15 has an inflow or inlet passage 16 and a relief or return passage 17, these two passages being in communication with each other through a passage 18 and a restricted orifice or throttling bore 40 hereinafter described. In the inflow passage 16 there is a regulator valve 19 which is axially adjustable. The fuel pump comprises the usual delivery passages, and cylinder bores or spaces 20 and pump pistons 21 which are moved from the shaft 22 by the cams 23. From the supply 16, passages or canals 24 lead to the cylinder bores 20, and passages 25 lead from the latter to the relief passage 17. The pump pistons are provided with bores 26 and recesses 27 which, after the execution of a certain piston stroke, allow the excess quantity of fuel to flow into the relief passage 17. The anti-friction rollers 65 of the pistons 21 are pressed by the springs 66 against the cams 23. The fuel is admitted at 28 past a non-return valve (not shown) which prevents back flow into the tank or reservoir. The valve 19 has an extension 29 upon which a sliding block 30 is loosely mounted, this block being pressed by a spring 43 against stop nuts 31 on the extension 29. A yoke 32, which is connected to the accelerator pedal lever (not shown) by way of the linkage 42, engages with the sliding block 30. The spring 43 bears at its inner end against the valve 19.

In order to compensate for the inaccuracies of machining, the controlling valve comprises, as illustrated in Figure 2, individual sleeve parts 33, 34, 35, 36 which are formed with shaped recesses 37. For example, Figure 4 shows one of these parts as being formed with a controlling recess of a depth increasing from the left to the right and from front to rear. Thus, for example, if the canal 24 is positioned opposite the recess 37 in the plane A, there will be produced a throttling cross-section $x_1$, as seen in Fig. 4a. While if the sleeve part 33 is shifted so that the canal 24 contacts the recess 37 in the plane D, a larger throttling cross-section $x_2$ will be formed, as is seen in Fig. 4b. In any event, the recess is shallow at one end and deep at the other. Each recess has a port passing through the sleeve as shown. The individual parts 33 to 36 are arranged upon a connecting tube 39 which has the throttling orifice 40 aforesaid at its end. The fuel flowing to the valve 19 passes through ports or passages 38 in the tube 39 and through the shaped recesses to the cylinders 20 by way of the passages 24. By turning the sleeve parts 33, 34, 35, 36 upon the tube 39, the cross sections of the passages or openings leading to the pump cylinders 20 can be varied when the parts are assembled and the inaccuracies of manufacture thus compensated for. Figure 5 illustrates a modification wherein the inflow to the cylinders 20 can be varied by adjustable screws 41 which extend into the passages 24. In this case, the controlling valve 19 is made in one piece with annular shaped recesses extending around it and the sleeve parts are dispensed with. As will be observed, the shaped recesses of the valve work in conjunction with the port openings of the passages 24.

The manner of operation is as follows: Movement is transmitted from the accelerator pedal, not shown, to the rod 42 and fork 32, so that the sliding block 30, through the spring 43, imparts axial movement to the valve 19. For acceleration of the engine, the valve 19 is moved towards the left in Figure 2, whereby the recesses 37 open the passages 24 leading to the pump cylinders 20 as far as is necessary. Upon releasing the accelerator pedal, the valve 19 is displaced towards the right under the action of a pedal spring, not shown, the block 30 operating on the valve through the stop nuts 31. By this movement, the inflow cross-sections are reduced so that a smaller quantity of fuel flows to the cylinders. If, during the regulating operation by the accelerator pedal, the ultimate speed of the engine becomes too high, then the controlling valve 19 is displaced to the right. A back pressure builds up against the inner end of the valve. Under the action of this pressure at the nozzle 40, the valve is moved to the right and the nuts 31, separate from the sliding block 30, the spring 43 being at the same time compressed. This rightward movement of the valve effects, of course, a reduction of the fuel supply. The movement of the valve in each direction is limited by stops 44 and 45 which may be adjustably screwed in the housing 15. By the displacement of the valve 19 towards the right, the inflow cross-sections leading to the pump cylinders are throttled and the quantity of fuel flowing to the cylinders is reduced, whereas the valve opens the maximum cross-section in its left hand end position.

The above-described regulating device will effect the delivery of the fuel pump in a manner which will be obvious to those skilled in this art. When the piston 21 moves downwardly from its uppermost position, after the return passage 25 has been closed, a vacuum will be created in the cylinder bore 20. If it is assumed that the valve 19 is displaced toward the left as seen in Fig. 2, thereby presenting a large opening from the supply 16 to the passage 24, as soon as the piston opens the passage 24, the fuel will rush into the cylinder bore 20, due to the effect of the vacuum and substantially fill this space. If, however, the valve 19 is moved toward the right, as seen in Fig. 2, the opening between the supply conduit 16 and the passage 24 will be substantially throttled, so that the vacuum produced in the cylinder space by descent of the piston 21 will draw in much less fuel than previously before the piston again rises. Therefore, during the up stroke of the piston 21, the total amount of fuel drawn into the cylinder space 20 will be so much less that the total delivery of the pump is substantially reduced.

In Figures 6 and 7, ports 46 lead from the interior of the tubular valve 19 to the shaped recesses 47 which are cut in the periphery of the valve and control the bores 24 leading to the pump pistons. The stroke of the valve 19 to the left may be limited by an adjustable stop 44. The fuel is admitted through openings 60, 61 into the interior of the valve and through the port 46 and recesses 47 to the passages 24 leading to the pump cylinders 20.

The housing 15 carries on the right-hand side, an extension for receiving a plug 85 possessing a stuffing box 86 with packing 48 through which a rod 49 is carried outwardly. This rod 49 has a head 50 which is moved rightwardly against the the valve 19, the rod 49 being passed freely through a hole 51 in the end of the valve. A spring 52 which abuts with one end against the plug 85, presses with its other end against the valve 19 and provides an appropriate force for counteracting the dynamic pressure which arises in front of the throttling bore 40 of the valve 19 with increasing quantity of returning oil. A suitable choice of spring gives automatic regulation of the maximum idle-running speed. A spring 63, which likewise abuts with one end against the plug 85, presses with its other end against a disc 54 on the outer end of the rod 49, thereby forcing the disc 54 against a cam 55 which can be turned by a lever 56. This lever 56 may be connected, for example, to the accelerator linkage. A spring 57 constantly tends to draw the lever 56 and cam 55 into the idle-running or stop position illustrated in Figure 7. A housing 59, for example, serves for the mounting of the cam shaft 58.

The operation of the arrangement in Figures 6 and 7 is as follows:

For the acceleration of the engine at will, the cam 55 is brought by the lever 56 into the position illustrated in Figure 6 and the rod 49 is thereby forced to the left, the spring 53 being compressed at the same time. Under the action of the spring 52, the valve 19 is likewise displaced to the left so that the shaped recesses 47 open the largest cross-section to the fuel inlet passages 24 and the pump pistons 21 supply a corresponding quantity of fuel to the cylinders of the engine. If the output of the engine is to be reduced, the spring 57, after release of the accelerator rod, brings the lever 56 and, with it, the cam 55 into a position in which the rod 49 is forced to the right under the action of the spring 53. The valve 19 is thus also moved rightwardly so that the cross-sections of openings leading to the bores 24 are reduced by the recesses 47. If the liquid pressure of the returning oil upon the controlling valve overcomes the force of the spring 52, then the controlling valve is displaced to the right until the cross sections and necessary quantity of oil are appropriately adjusted independently of the particular position determined at will.

If the fuel pump and the passages are to be de-aerated with the engine at rest, the valve 19 is moved to and fro by the accelerator linkage 32, 42, seen in Figure 8. The fuel is drawn in through the connection 62 which encloses a non-return valve 64 loaded by a spring 63. Upon drawing the valve to the right, fuel flows in from the supply passage, whereas upon pressing the valve to the left the fuel situated in the suction and return passages 16, 18, 17 is subjected to pressure such that the said fuel passes into the pressure spaces of the cylinders 20 of all the pumps and then through the pressure valves, not shown, into the pressure passages. When fuel issues from all the passages or from the nozzles, there is assurance that the pump and the passages are completely free from air.

Within the scope of the invention, it is immaterial whether the valve 19 is operated by the accelerator pedal or lever from the driver's position or by any other suitable device.

In the divided valve construction seen in Figures 9 to 11, the regulator valve comprises an inner tubular part 77 and an outer tubular part 67. The latter, which is provided for the regulation of the speed at will and is furnished with ports 68 opening into shaped recesses 69, slides in the inflow passage 16. The valve part 67 is provided at the one end with a screw-in tubular plug 70 and at the other end with a screw-in plug 71. Connected to the latter is a ball pivot 72 with which the linkage of the accelerator lever engages for the movement of the valve part 67 at will. The valve is sealed towards the outside by, for example, a flexible diaphragm 73 which is secured between the socket 74 and plug 75. The supply of fuel takes place through the connection 76 which is secured by the fixing of the socket 74 and is sealed towards the outside by suitable sealing means as shown.

The tubular valve part 77 slidable within the part 67 is for the automatic regulation of the maximum engine speed. This valve part 77 communicates with the relief passage 17 through a throttle opening 78 in a plug which is inserted in the inner end of the tubular part 77. The last-named is pressed by a spring 79 against the tubular plug 70 which acts as a stop in the outer valve part 67. A connecting duct 80 between the overflow passage 17 and inlet bore 16 is held by the screwed-in part 81 which encloses an adjustable stop 82 for the valve part 67. The valve part 77 is provided with ports 83 and shaped recesses 84 which overlap the ports 68 of the valve part 67 in normal operation, that is in the left hand end position of the valve.

The operation of the arrangement in Figures 9 to 11 is as follows:

For the variation at will of the output and speed of the internal combustion engine, the outer valve part 67 is displaced by the accelerator lever to the right or left and the passage cross-sections from the inflow 16 to the passages 24 and pump spaces 20 are thus varied so that more or less liquid passes into the cylinders of the internal combustion engine. The valve part 77 accompanies the valve 67 in these movements as long as no dynamic pressure arises from the overflow in front of the throttling bore 78. If, however, this dynamic pressure overcomes the force of the spring 79, then the valve 77 is displaced to the right against this spring force and the cross sections of the openings uncovered by the recesses and leading to the ports 68 are thus reduced, so that less fuel can flow through. By this means, the allowable maximum speed of the internal combustion engine cannot be exceeded. The recesses 84 on the valve part 77 are shorter than the recesses 69 on the valve part 67 so that reduction of the passage cross-sections takes place for a slight movement of the valve 77 and running away of the internal combustion engine is prevented by the rapid closure of the fuel supply means. The longer recesses of the valve part 67, however, afford the more gradual control which is required for accelerator pedal adjustments.

In connection with the form of regulator which is made in two relatively adjustable parts to take care of machining inaccuracies, it is to be noted that the sleeve may be assembled upon the connecting tube in any suitable manner known to the art. If desired, the adjustment can be made during assembly, the sleeve being forced onto the central tube in the desired position in which case no particular relative holding means will be necessary. For a less rigid, but more flexible correction, the sleeve may be slipped on the tube and adjusted by a suitable threaded interconnection or by pins. It is to be pointed out, however, that the particular means for obtaining the adjustment is without importance with respect to the principles of the present invention.

It will accordingly be seen that I have provided a construction which will satisfy the objects enumerated above, and while I have shown the invention in certain physical embodiments, it is to be understood that modifications of the structure shown may be made by those skilled in this art without departing from my invention as expressed in the claims which follow.

I claim:

1. In a fluid pump including at least one pump cylinder space having a piston therein, an inlet passage connected to the cylinder space, a delivery passage leading from the cylinder space, a return passage leading from said cylinder space to said inlet passage, regulating means movable in one direction or the other in accordance with the difference in pressure in said inlet and return passages for varying the amount of fluid supplied to said cylinder space, said regulating means including means intermediate said return and inlet passages having an interconnecting throttling bore for establishing a pressure differential between said inlet and return passages, and manual means for operating said regulating means.

2. In a fluid pump including at least one pump cylinder space having a piston therein, an inlet passage for said cylinder space, a canal in said pump, opening into said inlet passage and said cylinder space for injecting fluid to the latter from said inlet passage, a return passage leading from said cylinder space to said inlet passage an adjustable plug extending into said canal for varying its effective cross-sectional area, and an axially shiftable slide valve movable in one direction or the other in accordance with the difference in pressure within said inlet and return passages for varying the flow of fluid from said inlet passage to said canal, said slide valve including means intermediate said return and inlet passages having an interconnecting throttling bore for establishing a pressure differential between said inlet and return passages.

3. In a fluid pump including at least one pump cylinder space having a piston therein, an inlet passage connected to said cylinder space, a delivery passage leading from said cylinder space, a return passage leading from said cylinder space to said inlet passage, regulating means for varying the amount of fuel supply to said cylinder space, said regulating means including means intermediate said return and inlet passages having an interconnecting throttling bore for establishing a pressure differential between said inlet and return passages, an extension on said regulating means having a stop at the end thereof, a slide on said extension, spring means intermediate said regulating means and said slide for urging the latter against said stop, a control arm for moving said slide against said spring for actuation of said regulating means in one direction, and against said stop for actuation of said regulating means in the opposite direction, said regulating means also being subjected to the pressure within said return passage for movement thereof against said spring, independently of the position of said control arm.

4. In a fluid pump including at least one pump cylinder space having a piston therein, an inlet passage connected to said cylinder space, a delivery passage leading from said cylinder space, a return passage leading from said cylinder space to said inlet passage, a throttle valve axially shiftable in said inlet passage for controlling the amount of fluid to said cylinder space, said throttle valve including means intermediate said return and inlet passages having an interconnecting throttling bore for establishing a pressure differential between said inlet and return passages, a stuffing box closing one end of said inlet passage, first spring means intermediate said stuffing box and throttle valve for urging the latter in one direction, a rod extending through said stuffing box, having a head slidably engaging said valve on one end, and having an abutment plate on its other end, second spring means intermediate said stuffing box and said abutment plate for urging engagement of said head with said valve for movement of the latter against said first spring, and an adjustable cam in contact with said abutment plate for moving the same and thereby initiating axial shifting of said valve.

5. The combination according to claim 4, in which said valve is subjected to the pressure within said return passage for movement in a direction oppositely to the force of said first spring.

6. The combination according to claim 4, in which the second spring is stronger than the first spring.

7. In a fuel pump including at least one pump cylinder space having a piston therein, an inlet passage having a canal opening into said cylinder space, a hollow cylindrical slide valve mounted for reciprocatory movement within said inlet passage for controlling the flow of fluid through said canal, said slide valve being formed of an inner hollow cylinder having a passage therethrough and an outer hollow sleeve rotatably adjustable upon said inner cylinder and having a passage interconnecting the passage of said inner cylinder with the canal in said supply conduit, means for moving said slide valve, and a delivery passage leading from said cylinder space.

8. In a fuel pump including at least one pump cylinder space having a piston therein, an inlet passage having a canal opening into said cylinder space, a hollow cylindrical slide valve mounted for reciprocatory movement within said inlet passage for controlling the flow of fluid through said canal, said slide valve comprising an inner hollow cylinder having a passage therethrough and an outer hollow cylinder relatively longitudinally slidable upon said inner cylinder and having a passage interconnecting the passage of said inner cylinder with the canal in said inlet passage, a return passage in said pump leading from said cylinder space to said inlet passage, a delivery passage leading from said cylinder space, and means having a throttling bore in one end of said inner cylinder for establishing a pressure differential between said return and inlet passages, acting to move said inner cylinder relatively to said outer cylinder.

9. In an injection internal combustion engine, the combination of a fuel pump comprising a pump casing provided with separate pump pistons, a common inlet passage provided with canals leading to the individual pump cylinder spaces, a return passage provided with canals leading to said pump cylinder spaces, a restricted bore between said return conduit and said supply conduit, and relatively rotatably adjustable slide valve elements arranged concentrically one within the other in said supply conduit to control the fuel feed to the pump cylinder spaces.

SAMUEL MEISWINKEL.